US010249149B2

(12) United States Patent
Amaitis et al.

(10) Patent No.: US 10,249,149 B2
(45) **Date of Patent: *Apr. 2, 2019**

(54) SYSTEM AND METHOD FOR WAGERING BASED ON MULTIPLE FINANCIAL MARKET INDICATORS

(71) Applicant: CFPH, LLC, New York, NY (US)

(72) Inventors: Lee M. Amaitis, Las Vegas, NV (US); Joseph M. Asher, New York, NY (US); James C. Johnson, Cresskill, NJ (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,319

(22) Filed: Jan. 4, 2016

(65) Prior Publication Data

US 2016/0117891 A1 Apr. 28, 2016

Related U.S. Application Data

(63) Continuation of application No. 12/463,549, filed on May 11, 2009, now Pat. No. 9,230,407, which is a (Continued)

(51) Int. Cl.
*G06F 17/00* (2006.01)
*G06F 19/00* (2011.01)
(Continued)

(52) U.S. Cl.
CPC .............. *G07F 17/34* (2013.01); *G07F 17/32* (2013.01); *G07F 17/3213* (2013.01); *G07F 17/3286* (2013.01); *G07F 17/3288* (2013.01)

(58) Field of Classification Search
CPC .... G07F 17/32; G07F 17/3227; G07F 17/323; G07F 17/326; G07F 17/3262; G07F 17/3269; G07F 17/3286
See application file for complete search history.

(56) References Cited

U.S. PATENT DOCUMENTS 4,248,458 A 2/1981 Brody
4,288,077 A 9/1981 Rose et al.
(Continued)

FOREIGN PATENT DOCUMENTS

EP 1 139245 A1 10/2001
EP 1 234606 A1 8/2002
(Continued)

OTHER PUBLICATIONS

Random Walk Theory; http://www.streetauthority.com/tenns/r/random-walk-theory.asp; 3 pages; date unknown.
(Continued)

*Primary Examiner* — Milap Shah

(57) ABSTRACT

A method for wagering, comprises receiving a bet regarding a spin of the reels of a slot machine. The method continues by determining a first symbol for a first reel of the slot machine based at least in part upon a first value and a second value. The first value is associated with a value of a digit of a first financial market indicator at a first point in time, and the second value is associated with the value of a digit of a second financial market indicator at the first point in time. The method continues by determining a second symbol for a second reel of the slot machine, and by determining a third symbol for a third reel of the slot machine. The method concludes by determining an outcome of the bet based at least in part upon the first symbol, the second symbol, and the third symbol.

3 Claims, 4 Drawing Sheets

Related U.S. Application Data continuation of application No. 11/018,978, filed on Dec. 21, 2004, now Pat. No. 7,566,270, which is a continuation-in-part of application No. 10/836,077, filed on Apr. 29, 2004.

(51) Int. Cl.

| | |
|---|---|
| ***G07F 17/34*** | (2006.01) |
| ***G07F 17/32*** | (2006.01) |

(56) References Cited

U.S. PATENT DOCUMENTS 4,540,174 A 9/1985 Coppock
4,569,526 A 2/1986 Hamilton
4,666,160 A 5/1987 Hamilton
4,695,053 A 9/1987 Vazquez, Jr. et al.
4,817,951 A 4/1989 Crouch et al.
4,856,788 A 8/1989 Fischel
4,874,177 A 10/1989 Girardin
4,883,636 A 11/1989 Fantle, Jr.
4,935,748 A 6/1990 Schmidt et al.
4,962,950 A 10/1990 Champion
5,102,137 A * 4/1992 Ekiert ................ G07F 17/3244 273/143 R
5,518,239 A 5/1996 Johnston
5,524,888 A 6/1996 Heidel
5,586,937 A 12/1996 Menashe
5,683,090 A 11/1997 Zeile et al.
5,709,603 A 1/1998 Kaye
5,713,793 A 2/1998 Holte
5,722,890 A 3/1998 Libby et al.
5,743,525 A 4/1998 Haddad
5,749,785 A 5/1998 Rossides
5,782,470 A 7/1998 Langan
5,851,010 A 12/1998 Feinberg
5,888,136 A 3/1999 Herbert
6,001,016 A 12/1999 Walker et al.
6,024,641 A * 2/2000 Sarno .................... G07C 15/00 273/138.2
6,026,383 A 2/2000 Ausubel
6,038,554 A 3/2000 Vig
6,062,979 A 5/2000 Inoue
6,098,051 A 8/2000 Lupien et al.
6,102,797 A 8/2000 Kail
6,110,042 A 8/2000 Walker et al.
6,113,492 A 9/2000 Walker et al.
6,120,376 A 9/2000 Cherry
6,126,543 A 10/2000 Friedman
6,135,881 A 10/2000 Abbott et al.
6,152,822 A 11/2000 Herbert
6,157,918 A 12/2000 Shepherd
6,193,605 B1 2/2001 Libby et al.
6,296,569 B1 10/2001 Congello, Jr.
6,309,307 B1 10/2001 Krause et al.
6,321,212 B1 11/2001 Lange
6,325,721 B1 12/2001 Miyamoto et al.
6,331,148 B1 12/2001 Krause et al.
6,343,988 B1 2/2002 Walker et al.
6,358,150 B1 3/2002 Mir et al.
6,394,899 B1 5/2002 Walker
6,421,653 B1 7/2002 May
6,450,887 B1 9/2002 Mir et al.
6,527,270 B2 3/2003 Maksymec et al.
6,547,242 B1 4/2003 Sugiyama et al.
6,558,255 B2 5/2003 Walker et al.
6,616,529 B1 9/2003 Qian et al.
6,624,641 B1 9/2003 Krampitz et al.
6,656,042 B2 12/2003 Reiss et al.
6,663,107 B2 12/2003 Fisher et al.
6,666,769 B2 12/2003 Stronach
6,676,510 B1 * 1/2004 Bittman ............. G07F 17/3244 273/143 R
6,688,978 B1 2/2004 Herman
6,709,330 B1 3/2004 Klein et al.
6,869,360 B2 3/2005 Marks et al.
6,875,104 B2 4/2005 Hara
6,910,965 B2 6/2005 Downes
7,040,982 B1 5/2006 Jarvis et al.
7,094,151 B2 8/2006 Downes
7,155,409 B1 12/2006 Stroh et al.
7,160,189 B2 1/2007 Walker et al.
7,206,762 B2 4/2007 Sireau
7,233,922 B2 6/2007 Asher et al.
7,302,412 B1 11/2007 Speck
7,458,891 B2 12/2008 Asher et al.
7,566,268 B2 7/2009 Asher et al.
7,566,270 B2 * 7/2009 Amaitis ............. G07F 17/3288 463/16
7,604,537 B2 10/2009 Amaitis et al.
7,637,807 B2 12/2009 Asher et al.
7,693,781 B2 4/2010 Asher et al.
7,708,636 B2 5/2010 Asher et al.
7,711,628 B2 5/2010 Davie et al.
7,789,754 B2 9/2010 Asher et al.
7,835,961 B2 11/2010 Davie et al.
7,962,400 B2 6/2011 Amaitis et al.
8,460,085 B2 * 6/2013 Alderucci .......... G07F 17/3244 463/16
8,535,140 B2 9/2013 Alderucci et al.
8,684,814 B2 * 4/2014 Amaitis ............. G07F 17/3227 463/19
8,758,108 B2 6/2014 Amaitis et al.
8,968,078 B2 3/2015 Amaitis et al.
9,230,407 B2 * 1/2016 Amaitis ............. G07F 17/3288
9,293,004 B2 3/2016 Alderucci et al.
9,293,009 B2 3/2016 Asher et al.
9,355,527 B2 5/2016 Amaitis et al.
9,536,395 B2 1/2017 Alderucci et al.
2001/0032169 A1 10/2001 Sireau
2001/0039209 A1 11/2001 DeWeese et al.
2002/0032644 A1 3/2002 Corby et al.
2002/0073021 A1 6/2002 Ginsberg et al.
2002/0087447 A1 7/2002 McDonald et al.
2002/0115488 A1 8/2002 Berry et al.
2002/0142816 A1 10/2002 Stronach
2002/0142820 A1 10/2002 Bartlett
2002/0147047 A1 10/2002 Letovsky et al.
2002/0151340 A1 10/2002 Guinn et al.
2002/0151363 A1 10/2002 Letovsky et al.
2002/0183105 A1 12/2002 Cannon
2002/0198044 A1 12/2002 Walker et al.
2002/0198052 A1 12/2002 Soltys et al.
2003/0046218 A1 3/2003 Albanese et al.
2003/0054875 A1 3/2003 Marks et al.
2003/0109300 A1 6/2003 Walker et al.
2003/0157976 A1 8/2003 Simon et al.
2003/0178775 A1 9/2003 Fisher et al.
2003/0182214 A1 9/2003 Taylor et al.
2003/0182224 A1 9/2003 Horrigan et al.
2003/0190941 A1 10/2003 Byrne
2003/0195029 A1 10/2003 Frohm et al.
2003/0195841 A1 10/2003 Ginsberg et al.
2003/0199315 A1 10/2003 Downes
2003/0216170 A1 11/2003 Walker et al.
2003/0220134 A1 11/2003 Walker et al.
2003/0224847 A1 12/2003 Jaimet
2004/0009812 A1 1/2004 Scott
2004/0029627 A1 2/2004 Hannan et al.
2004/0048656 A1 3/2004 Krynicky
2004/0059666 A1 3/2004 Waelbroeck et al.
2004/0085447 A1 5/2004 Katta
2004/0102242 A1 5/2004 Poelmann
2004/0111358 A1 6/2004 Lange et al.
2004/0127281 A1 7/2004 Fong
2004/0133495 A1 7/2004 Bosch
2004/0166918 A1 8/2004 Walker et al.
2004/0166942 A1 8/2004 Muir
2004/0176159 A1 9/2004 Walker et al.
2004/0176994 A1 9/2004 Fine et al.
2004/0177023 A1 9/2004 Krowas et al.
2004/0204229 A1 10/2004 Walker et al.
2004/0204232 A1 10/2004 Asher et al.
2004/0210507 A1 10/2004 Asher
2004/0210511 A1 10/2004 Waelbroeck et al.

(56) References Cited

U.S. PATENT DOCUMENTS

| | | | |
|---|---|---|---|
| 2004/0214629 A1 | 10/2004 | Walker et al. | |
| 2004/0224770 A1 | 11/2004 | Wolf et al. | |
| 2004/0235542 A1* | 11/2004 | Stronach | G06Q 30/06 463/6 |
| 2005/0026670 A1 | 2/2005 | Lardie | |
| 2005/0027643 A1 | 2/2005 | Amaitis et al. | |
| 2005/0043078 A1 | 2/2005 | Sundstrom | |
| 2005/0049033 A1* | 3/2005 | Kojima | G07F 17/3211 463/20 |
| 2005/0049038 A1 | 3/2005 | Cuddy et al. | |
| 2005/0059467 A1 | 3/2005 | Saffari et al. | |
| 2005/0075963 A1 | 4/2005 | Balabon | |
| 2005/0085288 A1 | 4/2005 | Schugar et al. | |
| 2005/0091142 A1 | 4/2005 | Renton et al. | |
| 2005/0119962 A1 | 6/2005 | Bowen et al. | |
| 2005/0171891 A1 | 8/2005 | Daley et al. | |
| 2005/0197938 A1 | 9/2005 | Davie et al. | |
| 2005/0197939 A1 | 9/2005 | Davie et al. | |
| 2005/0197948 A1 | 9/2005 | Davie et al. | |
| 2005/0208996 A1 | 9/2005 | Friedman | |
| 2005/0245308 A1 | 11/2005 | Amaitis et al. | |
| 2005/0245310 A1 | 11/2005 | Amaitis et al. | |
| 2006/0026090 A1 | 2/2006 | Balabon | |
| 2006/0031157 A1 | 2/2006 | Gianakouros et al. | |
| 2006/0105839 A1 | 5/2006 | Graeve et al. | |
| 2006/0105840 A1 | 5/2006 | Graeve | |
| 2006/0199631 A1 | 9/2006 | McGill et al. | |
| 2006/0209190 A1 | 9/2006 | Walters | |
| 2007/0055607 A1 | 3/2007 | Wunsch et al. | |
| 2007/0060322 A1 | 3/2007 | Benrus | |
| 2007/0111777 A1 | 5/2007 | Amaitis et al. | |
| 2007/0117624 A1 | 5/2007 | Amaitis et al. | |
| 2007/0123336 A1 | 5/2007 | Amaitis et al. | |
| 2007/0129138 A1 | 6/2007 | Amaitis et al. | |
| 2007/0184892 A1 | 8/2007 | Asher et al. | |
| 2007/0207849 A1 | 9/2007 | Asher et al. | |
| 2007/0208642 A1 | 9/2007 | Asher et al. | |
| 2007/0288342 A1 | 12/2007 | Maclin et al. | |
| 2008/0004116 A1 | 1/2008 | Van Luchene et al. | |
| 2008/0021803 A1 | 1/2008 | Ahles et al. | |
| 2008/0032778 A1 | 2/2008 | Amaitis et al. | |
| 2008/0064499 A1 | 3/2008 | Grant | |
| 2008/0214274 A1 | 9/2008 | Thomas et al. | |
| 2009/0163265 A1 | 6/2009 | Amaitis et al. | |
| 2009/0163266 A1 | 6/2009 | Amaitis et al. | |
| 2010/0041463 A1 | 2/2010 | Amaitis et al. | |
| 2014/0302910 A1 | 10/2014 | Amaitis et al. | |
| 2016/0371918 A1 | 12/2016 | Alderucci | |
| 2018/0012443 A1 | 1/2018 | Alderucci et al. | |

FOREIGN PATENT DOCUMENTS

| | | |
|---|---|---|
| GB | 1574447 | 9/1980 |
| GB | 2180675 | 4/1987 |
| GB | 2299425 | 10/1996 |
| JP | 4-97765 | 3/1992 |
| JP | 2001-523869 | 11/2001 |
| JP | 2002-041809 | 2/2002 |
| JP | 2002-159624 | 6/2002 |
| JP | 2002-329115 | 11/2002 |
| JP | 2003-502780 | 1/2003 |
| JP | 2006-509308 | 3/2006 |
| JP | 2007-510225 | 4/2007 |
| WO | WO 98/04991 | 2/1998 |
| WO | WO 99/26204 | 5/1999 |
| WO | WO 99/60498 | 11/1999 |
| WO | WO 00/79442 A1 | 12/2000 |
| WO | WO 01/50831 | 7/2001 |
| WO | WO 01/77964 A2 | 10/2001 |
| WO | WO 01/86532 A1 | 11/2001 |
| WO | WO 2004/057440 | 7/2004 |
| WO | WO 2004/079671 A2 | 9/2004 |
| WO | WO 2005/045613 | 5/2005 |
| WO | WO 2005/065065 A2 | 7/2005 |

OTHER PUBLICATIONS

Welcome to binarybet.com; binarybet.com; 1 page; Date: 2003.

What is a Binary Bet?; binarybet.com; 1 page; Date: 2003.

Frequently Asked Questions; binarybet.com; 1 page; Date: 2003.

USPTO Office Action for U.S. Appl. No. 10/654,280 dated Apr. 7, 2005 (9 pages).

Fixed Odds Financial Betting; http://web.archive.org/web/20020329110541/http://betonmarkets.corn/; 2 pages; May 10, 2005.

Notification of Transmittal of the International Search Report and the Written Opinion of the International Searching Authority for International Application No. PCT/US2005/006853; 13 pages, May 10, 2005.

USPTO Office Action for U.S. Appl. No. 10/836,077, dated Jun. 28, 2007 (5 pages).

USPTO Office Action for U.S. Appl. No. 10/794,666, dated Sep. 27, 2007 (6 pages).

USPTO Office Action for U.S. Appl. No. 11/536,094, dated Oct. 25, 2007 (24 pages).

USPTO Office Action for U.S. Appl. No. 11/535,662, dated Nov. 1, 2007 (12 pages).

USPTO Office Action for U.S. Appl. No. 10/795,163, dated Mar. 13, 2008 (11 pages).

USPTO Office Action for U.S. Appl. No. 11/745,573, dated Apr. 10, 2008 (8 pages).

Australian Examiner's Report for Application 2004227808; 2 pages; dated May 16, 2008.

USPTO Office Action for U.S. Appl. No. 10/794,666, dated May 28, 2008 (11 pages).

Notification of Transmittal of the International Search Report and the Written Opinion of the International Searching Authority for International Application No. PCT/US05/15129; 8 pages; dated May 28, 2008.

USPTO Advisory Action for U.S. Appl. No. 10/836,077, dated Jun. 3, 2008 (2 pages).

USPTO Advisory Action for U.S. Appl. No. 11/018,978, dated Jul. 12, 2007 (3 pages).

USPTO Office Action for U.S. Appl. No. 11/018,978, dated May 14, 2008 (6 pages).

"NTRA All Star Jockey Championship Special Wagers," 3 pages, Date: At latest Apr. 29, 2004.

Wagering Information: Straight or Basic Wagers; Lone Star Park at Grand Prairie: Player's Guide; http://www.lonestarpark.com/bet info.asp; 3 pages; Date Unknown.

Wagering Information: Straight or Basic Wagers; NTRA.com, http://www.ntra.com/news.asp?type=playthehorses&id=4799; 3 pages; Date Unknown.

Glossary of Terms; NTRA.com; http://www.ntra.com/news.asp?type=playthehorses&id=4797; 4 pages; Date Unknown.

The Basics of Horseplay; NTRA.com; http://www.ntra.com/news.asp?type=playthehorses&id=4795; 2 pages; Date Unknown.

Ozgit, A.; Performance Based Sports Derivatives: A New Instrument; Chapter 3; pp. 83-121. Date Unknown.

Sauer, Raymond D.; The Economics of Wagering Markets; Journal of Economic Literature; vol. 36, No. 4; pp. 2021-2064; Date: Dec. 1998.

Bet with the People Who Know Racing; Racing Daily Forum; 15 pages; Date: Jul. 24, 2001.

Quote of the Day; Bet of the Day; London Times; 1 page; Date: Jul. 30, 2003.

The Patent Office Search Report for International Application No. GB 0320232.2; 6 pages; dated Dec. 17, 2003.

TradeSports Trading & Betting Exchange, Best Lines & Bonuses, What is Tradesports?; www.tradesports.com; 2 pages; Date: Apr. 27, 2004.

Savage, Sam L.: Prices, Probabilities and Predictions; ORIMS Today; 10 pages; Date: Jun. 2004.

USPTO Office Action for U.S. Appl. No. 10/654,280, dated Jul. 13, 2005 (17 pages).

USPTO Office Action for U.S. Appl. No. 10/654,280, dated Jan. 12, 2006 (11 pages).

(56) References Cited

OTHER PUBLICATIONS

Notification of Transmittal of the International Search Report and the Written Opinion of the International Searching Authority for International Application No. PCT/US05/46927; 9 pages; dated Jun. 19, 2006.
Notification of Transmittal of the International Search Report and the Written Opinion of the International Searching Authority for International Application No. PCT/US04/10028; 6 pages; dated Jun. 23, 2006.
USPTO Notice of Allowance and Fee(s) Due for U.S. Appl. No. 10/654,280, dated Jan. 25, 2007 (9 pages).
Notification of Transmittal of the International Search Report and the Written Opinion of the International Searching Authority for International Application No. PCT/US05/15001; 10 pages; dated Sep. 13, 2007.
USPTO Office Action for U.S. Appl. No. 10/836,077, dated Aug. 22, 2007 (17 pages).
USPTO Office Action for U.S. Appl. No. 10/836,077, dated Mar. 14, 2008 (11 pages).
USPTO Office Action for U.S. Appl. No. 11/018,978, dated May 18, 2006 (14 pages).
USPTO Office Action for U.S. Appl. No. 11/018,978, dated Apr. 25, 2007 (15 pages).
USPTO Office Action for U.S. Appl. No. 11/018,978, dated Aug. 17, 2007 (12 pages).
USPTO Office Action for U.S. Appl. No. 10/836,077, dated Oct. 28, 2008 (11 pages).
USPTO Office Action for U.S. Appl. No. 11/841,049, dated Nov. 26, 2008 (7 pages).
USPTO Office Action for U.S. Appl. No. 10/836,975, dated Aug. 31, 2007 (26 pages).
USPTO Office Action for U.S. Appl. No. 11/623,901, dated Mar. 12, 2008 (14 pages).
USPTO Office Action for U.S. Appl. No. 11/623,908, dated Feb. 4, 2008 (14 pages).
USPTO Office Action for U.S. Appl. No. 11/623,933, dated Apr. 29, 2008 (9 pages).
USPTO Office Action for U.S. Appl. No. 11/623,943, dated Mar. 17, 2008 (16 pages).
USPTO Office Action for U.S. Appl. No. 10/836,975, dated Feb. 9, 2007 (29 pages).
Marshall Fey, "Slot Machines, A Pictorial History of the First 100 Years", Fifth Edition, Liberty Belle Books, 1983, pp. 59-60 & 168.
Notification of Transmittal of the International Search Report and the Written Opinion of the International Searching Authority, or the Declaration for International Application No. PCT/US05/14667; 11 pages; dated Mar. 30, 2007.
Notification of Transmittal of the International Search Report and Written Opinion for International Application No. PCT/US05/15004, 6 pages; dated Jun. 14, 2006.
USPTO Office Action for U.S. Appl. No. 10/836,958, dated Mar. 7, 2008 (16 pages).
USPTO Office Action for U.S. Appl. No. 11/623,901, dated Dec. 24, 2008 (14 pages).
USPTO Office Action for U.S. Appl. No. 11/623,943, dated Jan. 6, 2009 (27 pages).
USPTO Office Action for U.S. Appl. No. 10/836,975, dated Nov. 20, 2008 (25 pages).
Notice of Allowance for U.S. Appl. No. 10/836,958; dated Oct. 6, 2008 (6 pages).
USPTO Notice of Allowance for U.S. Appl. No. 11/623,933, dated May 18, 2009 (27 pages).
USPTO Notice of Allowance for U.S. Appl. No. 11/018,978, dated May 26, 2009 (7 pages).
USPTO Notice of Allowance for U.S. Appl. No. 10/836,975, dated Jul. 1, 2009 (18 pages).
USPTO Office Action for U.S. Appl. No. 10/836,077, dated Jul. 31, 2009 (15 pages).
Random House Unabridged Dictionary, Copyright 1997, Random House Inc. on Infoplease, <http://dictionary.infoplease.com/formula>.
USPTO Notice of Allowance for U.S. Appl. No. 11/841,049, dated Sep. 8, 2009 (7 pages).
USPTO Examiner Interview Summary Record for U.S. Appl. No. 10/836,077, dated Oct. 13, 2009 (3 pages).
USPTO Notice of Allowance for U.S. Appl. No. 11/623,901; 28 pages; dated Dec. 18, 2009.
USPTO Notice of Allowance for U.S. Appl. No. 11/623,908; 27 pages; dated Dec. 18, 2009.
EPO Communication dated Jan. 15, 2010 forwarding Supplementary European Search Report for Application No. EP 05741231.4, dated Dec. 22, 2009 (2 pages).
USPTO Pre-Brief Appeal Conference Decision for U.S. Appl. No. 10/836,077, dated Feb. 12, 2010 (2 pages).
USPTO Examiner Interview Summary for U.S. Appl. No. 10/836,975, dated Jun. 5, 2009 (2 pages).
USPTO Pre-Brief Appeal Conference Decision for U.S. Appl. No. 10/836,975, dated Jun. 12, 2009 (2 pages).
USPTO Response to Amendment under Rule 312 for U.S. Appl. No. 10/836,975, dated Sep. 4, 2009 (2 pages).
USPTO Pre-Brief Appeal Conference Decision for U.S. Appl. No. 11/623,901, dated Jun. 30, 2009 (2 pages).
USPTO Pre-Brief Appeal Conference Decision for U.S. Appl. No. 11/623,943, dated Sep. 14, 2009 (2 pages).
USPTO Notice of Allowance and Fees Due for U.S. Appl. No. 11/623,901, dated Apr. 8, 2010 (6 pages).
EPO Communication dated Jan. 27, 2010 forwarding Supplementary European Search Report for Application No. EP 05744471.3, dated Jan. 15, 2010 (3 pages).
Australian Examiner's Report for Application No. 2005240605, dated Jun. 8, 2010 (2 pages).
EPO Communication and Exam Report for Application No. 05741231.4, dated Aug. 13, 2010 (5 pages).
Japanese Office Action with English translation for Application No. 2007-510986, dated May 25, 2010 (9 pages).
Japanese Office Action with English translation for Application No. 2007-511082, dated Jul. 13, 2010 (21 pages).
Japanese Office Action with English translation for Application No. 2007-548561, dated Sep. 7, 2010 (11 pages).
European Communication and extended European Search Report for Application No. 05855479.1, dated Sep. 24, 2010 (6 pages).
Australian Exam Report for Application No. 2005319039, dated Jul. 28, 2010 (2 pages).
USPTO Examiner's Answer to Appeal Brief for U.S. Appl. No. 10/836,077, dated Aug. 27, 2010 (31 pages).
AU Examination Report for Application No. 2005240588, dated Jun. 4, 2010 (2 pages).
EP Office Action for Application No. 05740565.4, dated Jun. 9, 2010 (4 pages).
Japanese Office Action with English translation for Application No. 2007-511050, dated May 25, 2010 (9 pages).
EP Office Action for Application No. 05744471.3 dated Jun. 16, 2010 (5 pages).
AU Examination Report for Application No. 2005241445, dated Jun. 8, 2010 (2 pages).
USPTO Office Action for U.S. Appl. No. 12/032,141, dated Jan. 21, 2011 (11 pages).
Japanese Office Action with English translation for Application No. 2007-511082, dated Jan. 18, 2011 (4 pages).
USPTO Office Action for U.S. Appl. No. 12/032,160, dated Feb. 3, 2011 (10 pages).
USPTO Office Action for U.S. Appl. No. 12/603,162, dated May 5, 2011 (11 pages).
Australian Notice of Acceptance for Application No. 2005240605, dated Jun. 22, 2011 (3 pages).
Japanese Office Action with English translation for Application No. 2007-510986, dated Apr. 12, 2011 (5 pages).
USPTO Office Action for U.S. Appl. No. 12/032,141, dated Jul. 27, 2011 (11 pages).
USPTO Office Action for U.S. Appl. No. 12/032,160, dated Jul. 27, 2011 (9 pages).

(56) References Cited

OTHER PUBLICATIONS

Japanese Official Questioning with English translation for Application No. 2007-511082, dated Aug. 9, 2011 (8 pages).
USPTO Office Action for U.S. Appl. No. 12/463,549, dated Dec. 29, 2011 (12 pages).
USPTO Office Action for U.S. Appl. No. 11/963,088, dated Nov. 25, 2011 (7 pages).
USPTO Office Action for U.S. Appl. No. 11/963,158, dated Oct. 3, 2011 (7 pages).
USPTO Office Action for U.S. Appl. No. 12/874,661, dated Nov. 22, 2011 (14 pages).
USPTO Office Action for U.S. Appl. No. 12/032,141, dated Feb. 6, 2012 (2 pages).
USPTO Office Action for U.S. Appl. No. 12/032,160, dated Feb. 6, 2012 (3 pages).
USPTO Office Action for U.S. Appl. No. 12/603,162, dated Apr. 13, 2012 (14 pages).
EPO Decision to Refuse for Application No. 05741231.4, dated Jan. 18, 2012 (4 pages).
Australian Notice of Acceptance for Application No. 2005319039, dated May 1, 2012 (3 pages).
Australian Exam Report for Application No. 2011232768, dated May 21, 2012 (2 pages).
Australian Exam Report for Application No. 2005241445, dated Mar. 7, 2012 (2 pages).
Canadian Exam Report for Application No. 2,564,301, dated Oct. 19, 2012 (3 pages).
US Office Action for U.S. Appl. No. 12/032,141; dated Jun. 13, 2012; 11 pages.
USPTO Office Action for U.S. Appl. No. 12/032,160, dated Jun. 13, 2012 (11 pages).
Australian Exam Report for Application No. 2012202392; dated Nov. 16, 2012 (3 pages).
EP Communication Pursuant to Article 94(3) EPC for Application No. 05855479.1; Oct. 17, 2012 (6 pages).
JP Office Action for Application No. 2011-111339; dated Sep. 4, 2012; 7 pages.
JP Office Action for Application No. 2011-10393; dated Nov. 20, 2012; 4 pages.
JP Office Action for Application No. 2011-10393; dated May 8, 2012; 4 pages.
US Office Action for U.S. Appl. No. 11/963,088; dated Aug. 20, 2012; 11 pages.
US Office Action for U.S. Appl. No. 11/963,158; dated Jun. 26, 2012; 13 pages.
JP Office Action for Application No. 2007-510986; dated Aug. 28, 2012; 5 pages.
US Office Action for U.S. Appl. No. 12/874,661; dated Sep. 27, 2012; 14 pages.
US Office Action for U.S. Appl. No. 12/631,208; dated Oct. 27, 2011; 15 pages.
US Office Action for U.S. Appl. No. 12/631,208; dated Sep. 25, 2012; 15 pages.
PCT International Search Report and Written Opinion for Application No. PCT/US2010/021986; dated Mar. 8, 2010; 8 pages.
"Hardware Random Number Generator", Wikipedia.org, Apr. 8, 2013; http://en.wikipedia.org/wiki/Hardware_random_number_generator.
USPTO Pre-Brief Appeal Conference Decision for U.S. Appl. No. 12/032,141, Mar. 26, 2013 (2 pages).
USPTO Notice of Allowance for U.S. Appl. No. 12/032,141, dated Apr. 10, 2013 (13 pages).
USPTO Pre-Brief Appeal Conference Decision for U.S. Appl. No. 12/032,160, Mar. 25, 2013 (2 pages).
USPTO Notice of Allowance and Fees due for for U.S. Appl. No. 12/032,160, dated Apr. 25, 2013 (15 pages).
USPTO Office Action for U.S. Appl. No. 12/603,162, dated Jul. 11, 2012 (2 pages).
USPTO Pre-Brief Appeal Conference Decision for U.S. Appl. No. 12/603,162, Jan. 31, 2013 (3 pages).
USPTO Office Action for U.S. Appl. No. 13/613,369, dated May 31, 2013 (10 pages).
USPTO Office Action for U.S. Appl. No. 12/463,549, dated May 10, 2013 (16 pages).
Canadian Exam Report for Application No. 2,564,462, dated Sep. 14, 2012 (3 pages).
Canadian Exam Report for Application No. 2,591,990, dated Feb. 1, 2013 (3 pages).
USPTO Pre-Brief Appeal Conference Decision for U.S. Appl. No. 11/963,088, Jun. 14, 2013 (2 pages).
USPTO Office Action for U.S. Appl. No. 11/963,088, dated Jun. 21, 2013 (12 pages).
USPTO Office Action for U.S. Appl. No. 11/963,158, dated Jun. 26, 2012 (13 pages).
USPTO Pre-Brief Appeal Conference Decision for U.S. Appl. No. 11/963,158, Apr. 24, 2013 (2 pages).
USPTO Office Action for U.S. Appl. No. 14/027,333, dated Oct. 24, 2013 (9 pages).
Japanese Office Action with English translation for Application No. 2011-111339, dated Jun. 4, 2013 (4 pages).
USPTO Notice of Allowance and Fees Due for U.S. Appl. No. 13/613,391; dated Sep. 17, 2013 (9 pages).
Canadian Exam Report for Application No. 2,564,455, dated Aug. 9, 2013 (3 pages).
Japanese Office Action with English translation for Application No. 2007-511050, dated Apr. 12, 2011 (6 pages).
USPTO Office Action for U.S. Appl. No. 12/874,661, dated Jun. 24, 2013 (12 pages).
USPTO Office Action for U.S. Appl. No. 13/615,501, dated Nov. 25, 2013 (14 pages).
USPTO Pre-Brief Appeal Conference Decision for U.S. Appl. No. 12/463,549, Dec. 20, 2013 (2 pages).
USPTO Notice of Allowance and Fees Due for U.S. Appl. No. 13/613,391; dated Feb. 4, 2014 (7 pages).
Canadian Exam Report for Application No. 2,564,301, dated Dec. 23, 2013 (3 pages).
Australian Notice of Acceptance for Application No. 2011232768 dated Feb. 25, 2014, 2 pages.
Canadian Exam Report for Application No. 2,564,462, dated Feb. 28, 2014 (3 pages).
Japanese Office Action with English translation for Application No. 2011-111339 dated Mar. 11, 2014 (6 pages).
USPTO Decision on Appeal for U.S. Appl. No. 10/836,077, Mar. 3, 2014 (6 pages).
USPTO Office Action for U.S. Appl. No. 12/603,162, dated Feb. 24, 2014 (10 pages).
USPTO Office Action for U.S. Appl. No. 13/613,369, dated Mar. 10, 2014 (10 pages).
USPTO Office Action for U.S. Appl. No. 13/613,369, dated Mar. 21, 2014 (3 pages).
USPTO Office Action for U.S. Appl. No. 11/963,088, dated Apr. 24, 2014 (11 pages).
USPTO Notice of Allowance and Fees Due for U.S. Appl. No. 11/963,158, dated Feb. 19, 2014 (7 pages).
Australian Exam Report for Application No. 2012201350 dated Feb. 21, 2014 (3 pages).
Japanese Office Action with English translation for Application No. 2012-285715 dated Mar. 4, 2014 (4 pages).
USPTO Office Action for U.S. Appl. No. 12/874,661, dated Apr. 24, 2014 (12 pages).
USPTO Office Action for U.S. Appl. No. 14/027,333, dated Jun. 11, 2014 (5 pages).
USPTO Notice of Allowance and Fees Due for U.S. Appl. No. 10/836,077, dated May 20, 2014 (15 pages).
USPTO Office Action for U.S. Appl. No. 13/913,848, dated Jun. 26, 2014 (12 pages).
Canadian Exam Report for App. No. 2,591,990, dated Aug. 4, 2014 (3 pages).
Australian Exam Report for App. No. 2010206571, dated Sep. 4, 2014 (3 pages).
European Communication and Decision to Refuse for Application No. 05855479.1, dated Feb. 18, 2014 (8 pages).

(56) References Cited

OTHER PUBLICATIONS

Canadian Exam Report for Application No. 2,564,462, dated Apr. 2, 2015 (4 pages).
Japanese Office Action with English translation for Application No. 2013-251131 dated May 12, 2015, 4 pages.
Canadian Exam Report for Application No. 2,564,455, dated Mar. 3, 2015 (4 pages).
Canadian Exam Report for Application No. 2,564,301, dated Dec. 9, 2014 (7 pages).
Japanese Office Action with English translation for Application No. 2011-548191 dated Jan. 6, 2015, 6 pages.
Australian Exam Report for App. No. 2014213547, dated Aug. 3, 2015 (3 pages).
Canadian Exam Report for Application No. 2,591,990, dated Feb. 12, 2016 (4 pages).
Canadian Exam Report for Application No. 2,564,462, dated Mar. 9, 2016 (4 pages).
Japanese Office Action with English translation for Application No. 2015-048004 dated Apr. 5, 2016, (4 pages).
Australian Exam Report for App. No. 2016210619, dated Aug. 9, 2016 (1 page).
Canadian Exam Report for Application No. 2,564,455, dated Apr. 21, 2016 (4 pages).
Australian Exam Report for Application No. 2015258282 dated Jan. 25, 2017 (2 pages).
Canadian Exam Report for Application No. 2564301, dated Mar. 3, 2017 (4 pages).
Japanese Office Action with English translation for Application No. 2015-048004 dated Apr. 4, 2017 (6 pages).
Canadian Exam Report for Application No. 2,564,455, dated Jun. 5, 2017 (5 pages).
Australian First Exam Report for App. No. 2016210619, dated Aug. 28, 2017 (4 pages).
Canadian Exam Report for Application No. 2564301, dated Oct. 24, 2017, 4 pages.
Canadian Exam Report for Application No. 2591990, dated Oct. 16, 2017 (6 pages).
Japanese Final Office Action with English translation for Application No. 2015-048004 dated Dec. 5, 2017 (4 pages).
Australian Second Exam Report for App. No. 2015258282, dated Jan. 19, 2018 (3 pages).
Canadian Exam Report for Application No. 2564301, dated Dec. 30, 2015, 6 pages.
Canadian Exam Report for Application No. 2,564,462, dated May 30, 2017, 6 pages.
Canadian Patent Appeal Board Office Action for Application No. 2,564,462, dated Sep. 18, 2018, 6 pages.
Canadian Exam Report for Application No. 2564301, dated Nov. 5, 2018, 6 pages.

* cited by examiner

SYSTEM AND METHOD FOR WAGERING BASED ON MULTIPLE FINANCIAL MARKET INDICATORS

RELATED APPLICATIONS

This application is a continuation of U.S. patent application Ser. No. 12/463,549, filed May 11, 2009, which is a continuation of U.S. patent application Ser. No. 11/018,978 (now U.S. Pat. No. 7,566,270), filed Dec. 21, 2004, which is a continuation-in-part of U.S. patent application Ser. No. 10/836,077, filed Apr. 29, 2004, each of which is hereby incorporated by reference herein in its entirety.

TECHNICAL FIELD OF THE INVENTION

This invention relates in general to gaming systems and methods and, more particularly, to systems and methods for wagering based on multiple financial market indicators.

BACKGROUND OF THE INVENTION

The rules to playing slot machines are quite simple A player deposits money and spins the reels. In a physical casino, the player spins the reels by either pushing a button or yanking on a lever. In an online casino, the player uses a mouse or any suitable computer key to click on the button or lever. A slot machine has one or more horizontal lines, or paylines, across the window of the slot machine. If a certain combination of symbols falls on a horizontal line when the reels stop, the player is a winner. Payouts vary by machine, and by the number of lines the player chooses to play.

In prior slot machines, the combination of symbols that line up on the reels of a slot machine are determined by a Random Number Generator. This is a computer program inside the machine that is used to generate a sequence of numbers in milliseconds. Each random number it generates corresponds to a reel combination. Even when a slot machine is not being used, the RNG keeps doing its job of generating numbers. Whatever random number was generated the split second the player pulled the handle (or hit the "bet one" or "max bet" button) will result in the corresponding reel combinations that appear on the screen. The RNG doesn't care how much was bet, whether the player pulled the handle or hit the spin button, whether it's the player's first play or last, whether the player is winning or losing, or whether the player is playing with or without a slot card. It just continually generates random numbers. If the player happens to be the lucky player that plays the very split second the RNG generated a number corresponding to a jackpot reel combination, the player will be a winner.

SUMMARY OF THE INVENTION

In one embodiment, a wagering system is provided. The wagering system comprises a client coupled to a controller. The client communicates a bet regarding a spin of the reels of a slot machine. The controller determines a first value for a first reel of the slot machine based at least in part upon the value of a digit of a first financial market indicator. The controller continues to determine a second value for a second reel of the slot machine, and a third value for a third reel of the slot machine. The controller then determines the outcome of the bet based at least in part upon the first value, the second value, and the third value.

In another embodiment, a method for wagering is provided. The method starts by receiving a bet indicating the value of a multi-digit number. The method continues by determining a first value based at least in part upon the value of a digit of a first financial market indicator, and by determining a second value based at least in part upon the value of a digit of a second financial market indicator. The method proceeds by determining a winning number based at least in part upon the first value and the second value. The method concludes by comparing the winning number against the value of the multi-digit number indicated by the bet, and by determining an outcome of the bet based at least in part upon the comparison.

In yet another embodiment, another method for wagering is provided. The method starts by receiving a bet regarding a spin of the reels of a slot machine. The method continues by determining a first symbol for a first reel of the slot machine based at least in part upon a first value and a second value. The first value is associated with a value of a digit of a first financial market indicator at a first point in time, and the second value is associated with the value of a digit of a second financial market indicator at the first point in time. The method continues by determining a second symbol for a second reel of the slot machine, and by determining a third symbol for a third reel of the slot machine. The method concludes by determining an outcome of the bet based at least in part upon the first symbol, the second symbol, and the third symbol.

Various embodiments of the present invention may benefit from numerous advantages. It should be noted that one or more embodiments may benefit from some, none, or all of the advantages discussed below. One advantage is that systems and methods provide bettors with gaming based upon the value of financial market indicators. Thus, a bettor may place a bet, such as a bet regarding the spin of the reels of a slot machine, in which the inputs for the game are determined based on the value of financial market indicators rather than the numbers generated by a Random Number Generator. Another advantage is that when financial market indicators are unavailable, such as on the weekends and holidays when financial markets are typically closed, the system determines inputs for the game based on some other type of non-random but unpredictable event.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF EXAMPLE EMBODIMENTS OF THE INVENTION

Figure 1:
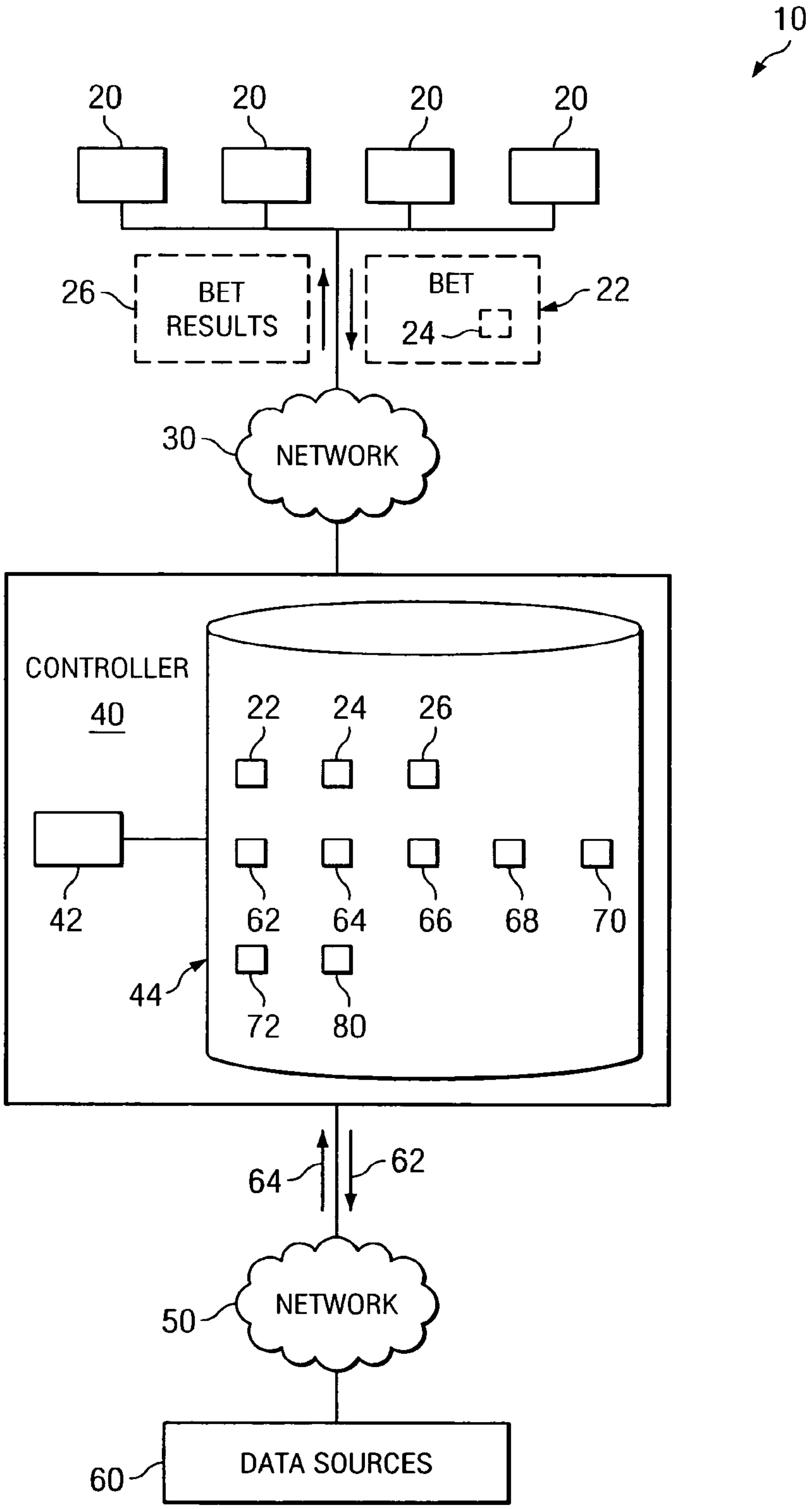
FIG. 1 illustrates an example system for wagering based on financial market indicators in accordance with an embodiment of the present invention.

FIG. 1 illustrates one embodiment of a system 10 that includes clients 20 coupled to a controller 40 using communication network 30. Controller 40 is further coupled to one or more data sources 60 using communication network 50. In general, system 10 provides for wagering based at least in part upon event information 64, such as financial market indicators.

Figure 2:
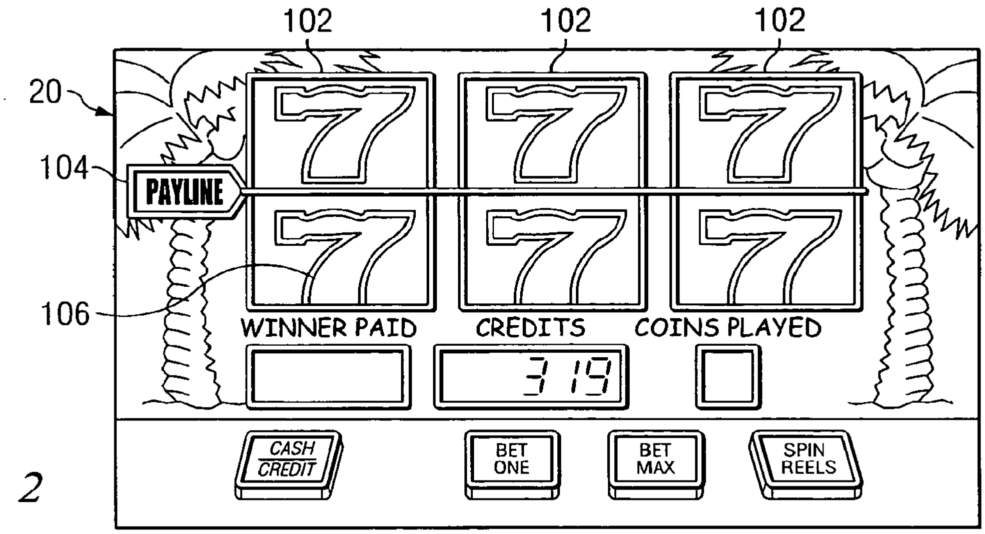
FIG. 2 illustrates one embodiment of a slot machine used with the system of FIG. 1.

Clients 20 are various users of system 10 that may place a bet 22 comprising bet parameters 24 and receive bet results 26. Clients 20 may also refer to the devices used by various users of system 10. Examples of these devices include a computer, a personal digital assistant, a mobile phone, a kiosk or point of sale terminal, or any other device that can interoperate with the elements of system 10 to perform the functions described herein. In a particular embodiment, clients 20 comprise physical slot machines. In other embodiments, clients 20 comprise devices, such as those described above, that can display a virtual slot machine to a user. FIG. 2 illustrates one example of such a slot machine 20.

Referring to FIG. 2, a slot machine 20, whether physical or virtual, includes any suitable number of reels 102, paylines 104, and symbols 106. Each reel 102 comprises a cylindrical spinning piece, or virtual display thereof, around which the symbols 106 are displayed. Each payline 104 comprises a line (e.g., horizontal, vertical, diagonal, or other) in the visible playing section of the slot machine 20. Each symbol 106 comprises a graphic, picture, image, or icon that is displayed on a reel 102. The symbols 106 may comprise, for example, blanks, cherries, bananas, oranges, diamonds, bells, lemons, numbers, bars, double bars, or any other recognizable images. The more reels 102 that are associated with the slot machine 20, the more permutations or possible combinations of symbols 106 are able to appear on the one or more paylines 104. The slot machine 20 illustrated in FIG. 2 is only one type of slot machine 20. The look and feel of slot machine 20 could change based on any number of factors associated with system 10, such as the type of data that is used to create the inputs for the slot machine 20. For example, if financial information 64 is used, then the look and of slot machine 20 feel (e.g., symbols 106, buttons, display, etc.) may be customized for financial markets.

Referring back to FIG. 1, communication networks 30 and 50 may comprise any suitable number and combination of local area networks, wide area networks (e.g., the Internet), wireless networks, or any other type of network that transfers data between controller 40 and the other elements of system 10, such as clients 20 and data sources 60. Although illustrated as two separate networks, all or a portion of networks 30 and 50 may be common to one another. Moreover, all or a portion of communication networks 30 and 50 may be a proprietary network. The transfer of data on network 30 may include the transfer of bets 22 and bet results 26. The transfer of data on network 50 may include a transfer of event data requests 62, such as financial market requests 62, and event information 64, such as financial market information 64.

Controller 40 comprises a processor 42 coupled to a memory 44. Processor 42 may comprise any suitable processor, such as a central processing unit (CPU) or other microprocessor, and may include any suitable number of processors working together. Memory 44 may comprise any suitable combination of volatile and non-volatile memory that stores bets 22, bet parameters 24, bet results 26, event data requests 62, event information 64, gaming rules 66, input values 68, input symbols 70 (used interchangeably with symbols 106), payouts 72, and wagering system software application 80. Processor 42 executes application 80 to process bets 22 based at least in part upon event information 64. Although the description detailed below discusses the controller 40 performing particular functions, it should be understood that some or all of the functions described as being performed by the controller 40 may be performed by clients 20.

Data sources 60 comprise any suitable source of real-time or substantially real-time event information 64. For example, data sources 60 may comprise a source of financial market information 64, such as market centers, market data vendors, news services, and the like. Financial market information 64 comprises information regarding the value, price, volume, or any other suitable indicator of a financial market index or any other suitable financial instrument (e.g., stocks, bonds, futures contracts, derivatives, etc.), referred to generally as a financial market indicator, during or at the end of a predetermined period of time or after one or more relevant transactions. For example, a financial market indicator may comprise the value of a certain financial market index, foreign or domestic, such as the Dow Jones Industrial Average (DJIA), the NASDAQ, the Financial Times Stock Exchange (FTSE), the S&P 500, the New York Stock Exchange, or any other suitable financial market index. In another example, the financial market indicator may comprise the value of a particular stock, bond, futures contract, or any other suitable financial instrument. The financial market indicator may be rounded, such as to the nearest whole point (e.g., a financial market indicator of 9,314.62 may be rounded up to 9,315), and/or include any suitable number of decimal places to provide an appropriate level of granularity. Therefore, each financial market indicator may comprise a plurality of numerical digits associated with the value of a corresponding financial market index or other financial instrument. As described in greater detail below, controller 40 may determine the outcome of bets 22 based at least in part upon the value of one or more digits that comprise a particular financial market indicator.

Although the description of system 10 is detailed with reference to financial markets, it should be understood that system 10 provides for the contingency whereby financial markets (and therefore financial market indicators) are unavailable at a given point in time. For example, financial markets may be closed at various times of the day, on weekends, or during holidays so that financial market indicators are unavailable at these times. In those instances, controller 40 uses event information 64 from other sources 60 to create inputs for the games, such as a slot machine game. The event information 64 may comprise any suitable numerical data that is not randomly generated but that is also not predictable. For example, the event information 64 may be related to the weather in one or more locations at a particular time; the U.S. national debt at a particular time; power consumption of a city at a particular time; the number of television shows tuned in to a particular channel or program at a particular time (e.g., television ratings); the power output of a facility at a particular time; horse race, dog race, jai alai, or other sporting event results at a particular time; or any other substantially changing numerical data that is related to non-random events.

In operation, controller 40 receives a bet 22 comprising bet parameters 24. In one embodiment, the bet 22 comprises a bet regarding a spin of the reels 102 of a slot machine 20. In another embodiment, the bet 22 comprises a bet regarding a "lottery" number. The bet parameters 24 comprise one or more of the identity of the client 20 that originated the bet 22; the amount of the bet 22; the time the bet 22 was placed; the type of bet 22 (e.g., slot machine bet, lottery bet, or other type bet); a period of time used to determine the appropriate financial market information 64; a particular digit of a financial market indicator (e.g., first digit, last digit, nth digit); and information that identifies one or more financial instruments used to determine the appropriate financial market information 64. In the embodiment where the type of bet 22 comprises a lottery bet 22, the bet parameters 24 may further include a multi-digit lottery number.

Controller 40 processes the bet 22 based at least in part upon financial market information 64. For example, suppose bet 22 specifies the DJIA, the S&P 500, and the NASDAQ, as financial market indices to be used to determine the outcome of bet 22. Suppose further that bet 22 specifies that the financial market indicators for these financial market indices should be captured ten seconds after the bet 22 is placed, as represented, for example, by a timestamp associated with bet 22 (other bets 22 could indicate that the financial market indicator that is used coincide in time with the timestamp communicated with the bet 22). In this example, controller 40 generates a financial market request 62 for the appropriate financial market information 64. In response to the financial market request 62, controller 40 receives the following financial market indicators representing the value of the DJIA, the S&P 500, and the NASDAQ ten seconds after the bet 22 was placed: DJIA—10,155; S&P 500—1112; and NASDAQ—1959. Suppose further that the bet parameters 24 of the bet 22 specified the use of the last digit of each of these financial market indicators to determine input values 68. Controller 40 therefore determines a first input value 68 of "5" (e.g., the last digit of the financial market indicator associated with the DJIA); a second input value 68 of "2" (e.g., the last digit of the financial market indicator associated with the S&P 500); and a third input value 68 of "9" (e.g., the last digit of the financial market indicator associated with the NASDAQ).

In other examples, the input values 68 may be determined based on other digits of a financial market indicator or by applying any suitable mathematical formula that uses one or more digits of one or more financial market indicators as operands. In still other examples, a second input value 68 may be based at least in part upon a second digit of a first financial market indicator (e.g., first input value 68 is the $n^{th}$ digit of DJIA and second input value 68 is the $m^{th}$ digit of DJIA).

Controller 40 determines the outcome of bet 22 based upon the first input value 68, the second input value 68, and the third input value 68. For example, suppose that bet 22 comprises a slot machine type bet 22. In this example, controller 40 maps the input values 68 to appropriate input symbols 70 for a slot machine 20, according to rules 66. In particular, controller 40 maps the first input value 68 to a first input symbol 70 for a first reel 102 of slot machine 20. Controller 40 maps the second input value 68 to a second input symbol 70 for a second reel 102 of slot machine 20. Controller 40 maps the third input value 68 to a third input symbol 70 for a third reel 102 of slot machine 20. The first reel 102, the second reel 102, and the third reel 102 may be arranged in any suitable order in the slot machine 20, so that the ordering of the financial market indicators when applied to the reels 102 of the slot machine 20 may comprise one of "529," "592," "259," "295," "952," or "925" based upon rules 66 or bet parameters 24.

Rules 66 specify a mapping of numeric digits to particular input symbols 70. For example, rules 66 may specify the following mapping:

"0"=Blank
"1"=Cherry
"2"=Banana
"3"=Orange
"4"=Diamond
"5"=Bell
"6"=Lemon
"7"=Seven
"8"=Bar
"9"=Double Bar Of course, controller 40 may use any suitable mapping of numeric digits to input symbols 70, and the mapping provided above is only an example of one such mapping. Moreover, particular embodiments of system 10 use bonus symbols 70 to create a jackpot. For example, from time to time, any of the numeric digits from "0" to "9" could result in a bonus symbol 70, such as a "$," "+," "#," "£," "¥," etc. If one or more of the reels 102 results in a bonus symbol 70, then the user wins an enhanced payout 72. For example, if one reel 102 results in a bonus symbol 70, the user may win a higher payout 72 than normal. If two reels 102 result in a bonus symbol 70, the user may win a still higher payout 72. If all three reels 102 result in a bonus symbol 70, the user may win a jackpot payout 72. The occurrence of a bonus symbol 70 for any given reel 102 could be based upon predetermined odds. For example, the odds of receiving a bonus symbol 70 for any given reel 102 may be 100-1. The odds of receiving a bonus symbol 70 for two reels 102 would therefore be 1000-1. The odd of receiving a bonus symbol 70 for all three reels 102 would therefore be 1,000,000-1. The payouts 72 for each of these results could then be predicated upon the predetermined odds, taking into account a predetermined house advantage.

Using the mapping set forth above, controller 40 therefore determines that the spin of the reels 102 of slot machine 20 associated with bet 22 resulted in a combination of "Bell," "Banana," and "Double Bar" at the payline 104. Controller 40 applies rules 66 to determine bet results 26. That is, controller 40 applies rules 66 to determine whether this combination of symbols 70 results in a "win," a "loss," or a "tie". Controller 40 also applies rules 66 to determine a payout 72 based upon the resulting combination of symbols 70 and the amount of the bet 22. In this regard, rules 66 include the winning combinations of symbols 70, the payout odds associated therewith, and any other factors used to determine a bet result 26 and/or a payout 72. Controller 40 communicates bet results 26 and any other data used to display the appropriate symbols 70 on the reels 102 of slot machine 20.

Controller 40 may also determine the outcome of bet 22 based upon the first input value 68, the second input value 68, and third input value 68 if bet 22 comprises a lottery type bet 22. In this example, suppose the bet parameters 24 specified a multi-digit lottery number of "529" and specified that this number was to be formed using the last digit of the DJIA, S&P 500, and NASDAQ, in that order, ten seconds after the bet 22 was placed. Based upon the financial market indicators described above, controller 40 determines a winning number of "529." In other examples, the winning number may be determined by applying any suitable mathematical formula that uses one or more determined input values 68 (or financial market indicators) as the operands.

Controller 40 compares the multi-digit lottery number of "529" specified by the bet parameters 24 with the winning number "529" determined according to financial market information 64 to determine the outcome of lottery type bet 22. In this example, controller 40 determines that bet 22 "wins." Controller 40 determines an appropriate payout 72 for the winning bet 22 based at least in part upon the amount of the bet 22 and/or the payout odds associated with such a bet 22 as specified by rules 66. For example, with respect to a three-digit lottery type bet 22, rules 66 may specify payout odds of 500-1. Therefore, if the amount of the bet 22 was $1, then the payout 72 would comprise $500.00.

Figure 3:
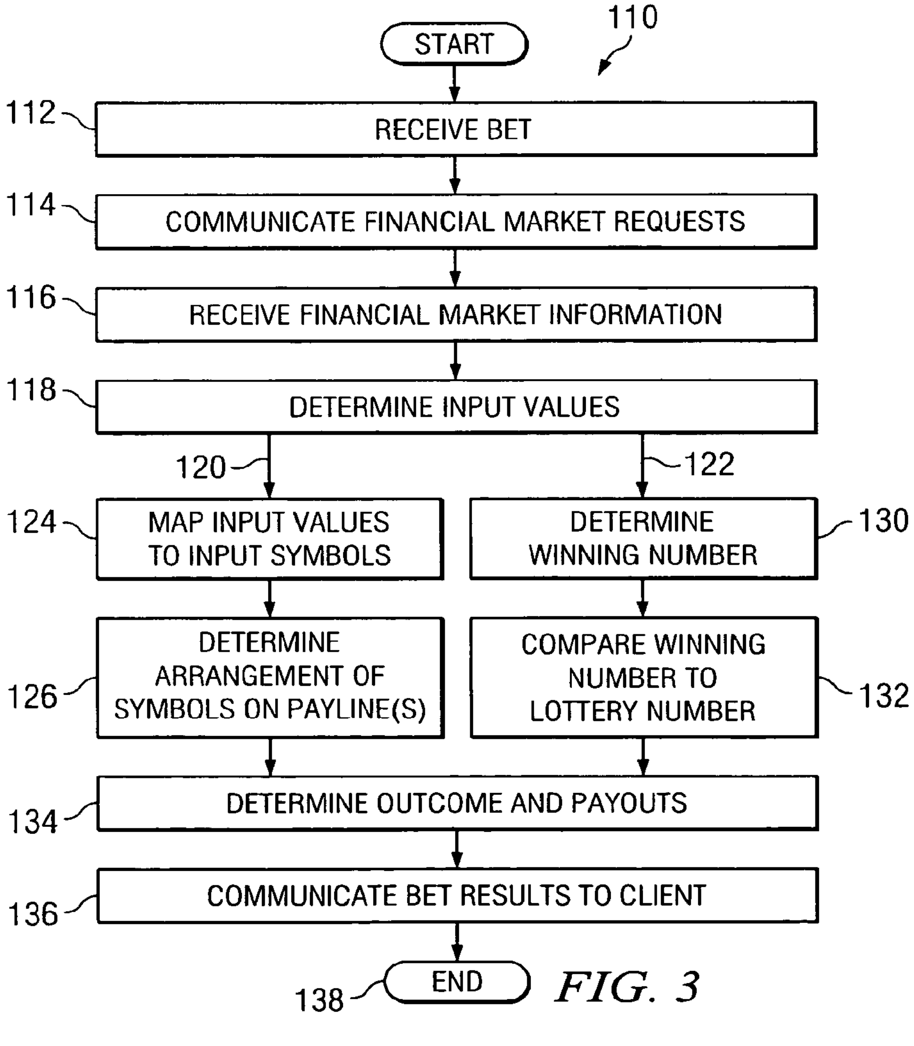
FIG. 3 illustrates a flowchart depicting one example method for wagering based on financial market indicators.

FIG. 3 illustrates a flowchart 110 depicting one example method for wagering based on financial market indicators. At step 112, controller 40 receives a bet 22 from a client 20. The bet 22 may specify particular financial instruments and a predetermined period of time to be used to determine one or more financial market indicators. For example, the bet 22 may specify to capture financial market indicators for the DJIA, the S&P 500, and the NASDAQ ten seconds after the bet 22 is placed. Bet 22 may further specify additional bet parameters 24. Controller 40 communicates appropriate financial market requests 62 at step 114 and receives appropriate financial market information 64 at step 116. In other embodiments, controller 40 may simply capture the appropriate financial market information 64 without issuing any requests 62. In still other embodiments when financial market indicators are unavailable, controller 40 captures other event information 64 for use in later steps of the method.

Execution proceeds to step 118 where controller 40 determines the input values 68 based upon the financial market information 64 received at step 116. Controller 40 may determine any suitable number of input values 68 from any suitable number and combination of financial market indicators using any suitable techniques described in greater detail above with regard to FIG. 1. From here, execution proceeds along path 120 if the bet 22 is a slot machine type bet 22, and along path 122 if the bet 22 is a lottery type bet 22.

Proceeding along path 120, controller 40 maps input values 68 determined at step 118 to input symbols 70 at step 124. Controller 40 determines the arrangement of input symbols 70 on the one or more paylines 104 of the slot machine 20 at step 126. This arrangement may be based at least in part upon bet parameters 24. For example, the bet parameters 24 may dictate that the financial market indicators for the DJIA, the S&P 500, and the NASDAQ should be used in that specific order.

Proceeding along path 122, controller 40 determines the winning number, at step 130, based at least in part upon the input values 68 determined at step 118. Controller 40 compares the winning number determined at step 130 to the lottery number specified by the bet 22, at step 132.

Whether execution proceeded along path 120 or path 122, execution now proceeds to step 134 where controller 40 determines one or more outcomes of the bet 22 and payouts 72. Controller 40 communicates bet results 136 to client 20 at step 136. Execution terminates at step 138.

Figure 4:
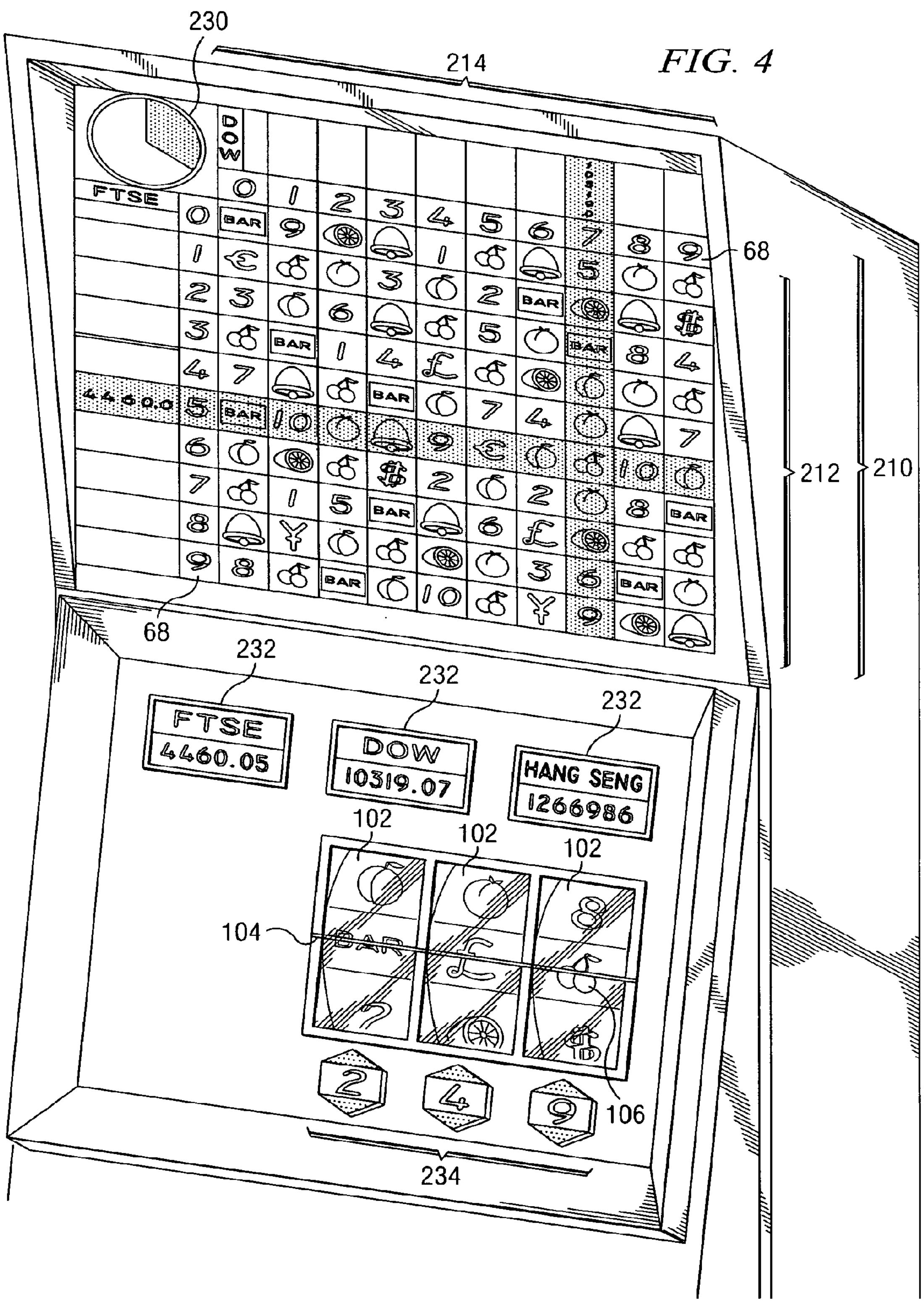
FIG. 4 illustrates another embodiment of a slot machine used with the system of FIG. 1.

FIG. 4 illustrates another embodiment of a slot machine that may be used in system 10. As with the slot machine 20 of FIG. 2, slot machine 200 includes any suitable number of reels 102, paylines 104, and symbols 106. Slot machine 200 further includes a symbol matrix 210. Symbol matrix 210 comprises an n-dimensional array of symbols 106. As illustrated, symbol matrix 210 is a two-dimensional array having rows 212 of symbols 106 that intersect with columns 214 of symbols 106. Rows 212 and columns 214 are associated with input values 68. As described above, input values 68 may be determined according to the values of one or more digits of one or more financial market indicators at various points in time. Each symbol 106 associated with a particular reel 102 may be determined according to an intersection of rows 212 and columns 214 based at least in part on input values 68. Slot machine 200 further includes a timer 230, input selections 232 and betting windows 234.

In operation, controller 40 receives a bet 22 comprising bet parameters 24. In one embodiment, the bet 22 comprises a bet regarding a spin of the reels 102 of slot machine 200. Alternatively, or in addition, the bet 22 comprises a bet regarding a lottery number selected in betting windows 234. The bet parameters 24 comprise one or more of the identity of the client 20 that originated the bet 22; the amount of the bet 22; the time the bet 22 was placed; the type of bet 22 (e.g., slot machine bet, lottery bet, or other type bet); one or more periods of time used to determine the appropriate financial market information 64; a particular digit of a financial market indicator (e.g., first digit, last digit, nth digit); and information that identifies one or more financial instruments used to determine the appropriate financial market information 64 (e.g., from input selections 232). In the embodiment where the type of bet 22 comprises a lottery bet 22, the bet parameters 24 may further comprise multiple symbols 106 that are selected in betting windows 234. This bet 22 is therefore a bet on the predicted composition of symbols 106 associated with the reels 102 of the slot machine 200.

Controller 40 processes the bet 22 based at least in part upon financial market information 64. For example, suppose bet 22 specifies the FTSE and the DJIA as financial market indices to be used to determine the outcome of bet 22. Suppose further that bet 22 specifies that the financial market indicators for these financial market indices should be captured ten seconds, twenty seconds, and thirty seconds after the bet 22 is placed, as represented, for example, by a timestamp associated with bet 22. In this example, controller 40 generates a financial market request 62 for the appropriate financial market information 64. In response to the financial market request 62, controller 40 may receive the following financial market indicators representing the value of the FTSE and the DJIA at the appropriate time intervals specified in the bet:

After ten seconds: FTSE—4,460.10
DJIA—10319.20
After twenty seconds: FTSE—4,460.17
DJIA—10319.26
After thirty seconds: FTSE—4,460.05
DJIA—10,319.07

Suppose further that the bet parameters 24 of the bet 22 specified the use of the last digit of each of these financial market indicators to determine input values 68 for each time interval of the bet 22. For the first time interval of ten seconds after the bet 22 is placed, controller 40 therefore determines a first input value 68 of "0" (e.g., the last digit of the financial market indicator associated with the FTSE), and a second input value 68 of "0" (e.g., the last digit of the financial market indicator associated with the DJIA). Controller 40 then determines that the intersection of "0" and "0" in the symbol matrix 210 corresponds to the symbol 106 of "BAR". Controller 40 therefore associates the symbol 106 of "BAR" with the first reel 102 of the slot machine 200.

For the second time interval of twenty seconds after the bet 22 is placed, controller 20 determines a first input value 68 of "7" (e.g., the last digit of the financial market indicator associated with the FTSE), and a second input value 68 of "6" (e.g., the last digit of the financial market indicator associated with the DJIA). Controller 40 then determines that the intersection of "7" and "6" in the symbol matrix 210 corresponds to the symbol 106 of "£". Controller 40 therefore associates the symbol 106 of "£" with the second reel 102 of the slot machine 200.

For the third time interval of thirty seconds after the bet 22 is placed, controller 20 determines a first input value 68 of "5" (e.g., the last digit of the financial market indicator associated with the FTSE), and a second input value 68 of "7" (e.g., the last digit of the financial market indicator associated with the DJIA). Controller 40 then determines that the intersection of "5" and "7" in the symbol matrix 210 corresponds to the symbol 106 of a "Cherry." Controller 40 therefore associates the symbol 106 of a cherry with the third reel 102 of the slot machine 200.

Controller 40 therefore determines that the spin of the reels 102 of slot machine 200 associated with bet 22 resulted in a combination of "BAR," "£," and "Cherry" at the payline 104. Controller 40 applies rules 66 to determine bet results 26 based on this combination of symbols 106. That is, controller 40 applies rules 66 to determine whether this combination of symbols 106 results in a "win," a "loss," or a "tie". Controller 40 also applies rules 66 to determine a payout 72 based upon the resulting combination of symbols 106 and the amount of the bet 22. In this regard, rules 66 include the winning combinations of symbols 106, the payout odds associated therewith, and any other factors used to determine a bet result 26 and/or a payout 72. Controller 40 communicates bet results 26 and any other data used to display the appropriate symbols 106 on the reels 102 of slot machine 200 (e.g, as symbols 106).

In other examples, the input values 68 may be determined based on other digits of the financial market indicators or by applying any suitable mathematical formula that uses one or more digits of one or more financial market indicators as operands. In still other examples, the symbols 106 for different reels 102 of the slot machine 200 may be derived from different financial market indicators. In particular, referring back to the example above, the symbol 106 for the second reel 102 of the slot machine 200 may be derived from the value of a digit of financial market indicators besides the FTSE and the DJIA. Moreover, the symbol 106 for the second reel 102 of the slot machine 200 may be derived from the value of a digit of one or the other of the FTSE and the DJIA in combination with the value of a digit of a financial market indicator besides the FTSE and the DJIA. In this regard, any suitable combinations of financial market indicators and/or digits associated therewith can be used to derive the symbols 106 of the different reels 102 of the slot machine 200.

In one embodiment, the symbols 106 of the symbol matrix 210 may change until the bet 22 is placed, at which time they become fixed. Alternatively, or in addition, the symbols 106 may change in between the various time intervals and become fixed at the expiration of each of the time intervals. For example, the symbols 106 may be constantly changing until the bet 22 is placed and the first time interval expires, such as ten seconds after the bet 22 is placed. At this point in time, the symbols 106 become fixed so that a particular symbol 106 may be determined for the first reel 102 of the slot machine 200. Once the symbol 106 for the first reel 102 is determined, the symbols 106 may continue to change until the expiration of the second time interval, such as twenty seconds after the bet 22 is placed. At this point in time, the symbols 106 become fixed once again so that a particular symbol 106 may be determined for the second reel 102 of the slot machine 200. Once the symbol 106 for the second reel 102 is determined, the symbols 106 may again continue to change until the expiration of the third time interval, such as thirty seconds after the bet 22 is placed. At this point in time, the symbols 106 become fixed once again so that a particular symbol 106 may be determined for the third reel 102 of the slot machine 200.

Controller 40 may also determine the outcome of a lottery type bet 22. In this example, suppose the bet parameters 24 predicted the composition of symbols 106 to be "2," "4," and "9" as illustrated in FIG. 4. Based upon the financial market indicators described above, and the resulting symbols 106 that appear on the payline 104 (e.g., "BAR," "£," and "Cherry"), controller 40 would determine that none of the symbols 106 of the lottery type bet 22 match the symbols 106 appearing in the payline 104. Therefore, controller 40 would determine the lottery type bet 22 to be a "loss." In particular embodiments, the controller 40 could determine the result of the bet 22 (e.g., a "win," "loss," or "tie") and the payout 72 associated therewith based on the number and type of symbols 106 from the bet 22 that match the symbols 106 ultimately appearing in the payline 104 of the slot machine 200. The payout 72 could further be determined based on the amount of the bet 22 and/or the payout odds associated with such a bet 22 as specified by rules 66.

Figure 5:
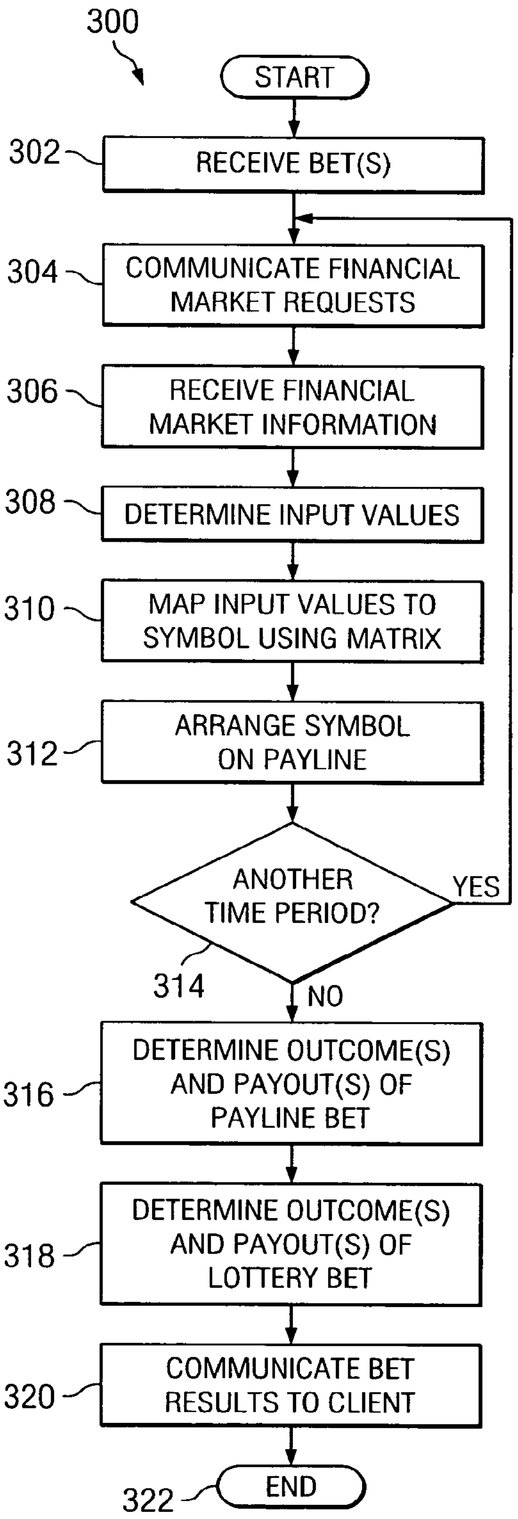
FIG. 5 illustrates a flowchart depicting another example method for wagering based on financial market indicators.

FIG. 5 illustrates a flowchart 300 depicting one example method for wagering based on multiple financial market indicators. At step 302, controller 40 receives a bet 22 from a client 20. The bet 22 may specify particular bet parameters 24. Controller 40 communicates appropriate financial market requests 62 at step 304 and receives appropriate financial market information 64 at step 306. In other embodiments, controller 40 may simply capture the appropriate financial market information 64 without issuing any requests 62. In still other embodiments when financial market indicators are unavailable, controller 40 captures other event information 64 for use in later steps of the method.

Execution proceeds to step 308 where controller 40 determines the input values 68 based upon the financial market information 64 received at step 306. Controller 40 may determine any suitable number of input values 68 from any suitable number and combination of financial market indicators using any suitable techniques described in greater detail above with regard to FIG. 4. At step 310, controller 40 maps input values 68 determined at step 308 to a symbol 106 using matrix 210. Controller 40 arranges the symbol 106 determined at step 310 onto a particular reel 102 at payline 104 at step 312.

If another time period associated with timer 230 is applicable, as determined at step 314, controller 40 repeats any suitable number and combination of steps 304-312 to determine and arrange another symbol 106 on another reel 102 at the payline 104. In some embodiments, one or more of steps 304-308 are performed only once to determine the appropriate input values used to determine the symbols 106 used in steps 310-312. If another time period is not applicable, as determined at step 314, execution proceeds to step 316 where controller 40 determines the outcome and payout of the bet 22 on payline 104. If a lottery type bet 22 was also placed, execution proceeds to step 318 where controller 40 determines the outcome and payout of the lottery bet 22. The bet results are communicated to the client 20 at step 320 and execution terminates at step 322.

It should be understood that in alternative embodiments, the present invention contemplates using methods with additional steps, fewer steps, different steps, or steps in different sequential order so long as the steps remain appropriate for wagering based on financial market indicators.

Although embodiments of the invention and their advantages are described in detail, a person skilled in the art could make various alterations, additions, and omissions without departing from the spirit and scope of the present invention as defined by the appended claims.

What is claimed is:

1. A wagering system, comprising:

at least one processor, the at least one processor communicatively coupled to at least one client device comprising at least one display;

a computer-readable medium electronically coupled to the at least one processor, the computer-readable medium comprising software that when executed by the at least one processor, directs the at least one processor to:

determine a symbol for a reel of a slot machine based at least in part upon 1) a value of a digit of a financial market indicator, and 2) a value of a digit of another financial market indicator, at least one of the financial market indicators specified by a user of the at least one client device; and communicate the symbol for the reel to the at least one client device for display.

2. A method performed by a least one processor communicatively coupled to at least one client device, comprising:

determining by the at least one processor a symbol for a reel of a slot machine based at least in part upon 1) a value of a digit of a financial market indicator, and 2) a value a digit of another financial market indicator, at least one of the financial market indicators specified by a user of the at least one client device; and communicating the symbol for the reel to the at least one client device data for display.

3. A slot machine device, comprising:

at least one processor and a plurality of slot machine reels;

a computer-readable medium electronically coupled to the at least one processor, the computer-readable medium comprising software that when executed by the at least one processor, directs the at least one processor to:

determine a symbol for a least one of the plurality of slot machine reels, based at least in part upon 1) a value of a digit of a financial market indicator, and 2) a value of a digit of another financial market indicator, at least one of the financial market indicators specified by a user of the slot machine device; and display the symbol on the at least one slot machine reel.

* * * * *